(12) United States Patent
Chellali et al.

(10) Patent No.: US 6,201,830 B1
(45) Date of Patent: Mar. 13, 2001

(54) LOW COMPUTATION IDLE TRANSMISSION METHOD FOR DSL MODEMS

(75) Inventors: Adam M. Chellali, Dallas; Michael O. Polley; Alan Gatherer, both of Richardson, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/096,061

(22) Filed: Jun. 11, 1998

Related U.S. Application Data

(60) Provisional application No. 60/052,855, filed on Jun. 11, 1997.

(51) Int. Cl.[7] .................. H04B 1/38; H04L 5/16
(52) U.S. Cl. .................. 375/222; 370/287
(58) Field of Search .................. 375/222, 219, 375/220, 224, 228, 130, 133, 134, 137, 259, 340; 370/287–282, 311; 379/407; 455/38.3, 343

(56) References Cited

U.S. PATENT DOCUMENTS

| | | | | |
|---|---|---|---|---|
| 4,468,785 | * | 8/1984 | Harris | 375/214 |
| 4,507,792 | * | 3/1985 | Yamakido et al. | 375/249 |
| 4,569,062 | * | 2/1986 | Dellande et al. | 375/370 |
| 4,841,440 | * | 6/1989 | Yonezu et al. | 713/322 |
| 5,416,726 | * | 5/1995 | Garcia-Duarte et al. | 713/300 |
| 5,553,076 | * | 9/1996 | Behtash et al. | 370/311 |
| 5,619,531 | * | 4/1997 | Taylor et al. | 375/222 |
| 5,751,701 | * | 5/1998 | Langberg et al. | 370/281 |
| 5,805,669 | * | 9/1998 | Bingel et al. | 379/28 |
| 5,903,612 | * | 5/1999 | Van Der Putten et al. | 375/316 |
| 5,933,415 | * | 8/1999 | Huloux | 370/252 |
| 5,995,540 | * | 11/1999 | Draganic | 375/222 |

* cited by examiner

Primary Examiner—Stephen Chin
Assistant Examiner—Lenny Jiang
(74) Attorney, Agent, or Firm—Warren L. Franz; Wade James Brady, III; Frederick J. Telecky, Jr.

(57) ABSTRACT

A method is described for reducing computational requirements during idle transmission in remote access systems incorporating digital subscriber line (DSL) modems, including asymmetrical DSL (ADSL) systems. Processing power is saved during idle transmission by generating an idle signal using low-complexity techniques. The generated idle signal is made spectrally compatible with xDSL systems, and a non-disruptive signaling scheme is used to indicate to the far-end receiver the transition between idle to active or active to idle status. A technique is presented that modulates the phase of the pilot tone to signal status transitions to the remote receiver. The computational complexity at the receiver is reduced because fill demodulation and decoding is not required to determine that an idle signal is being transmitted.

20 Claims, 3 Drawing Sheets

LOW COMPUTATION IDLE TRANSMISSION METHOD FOR DSL MODEMS

This application claims priority under 35 USC § 119(e)(1) of provisional application Ser. No. 60/052,855 filed Jun. 11, 1997, the entirety of which is incorporated herein by reference.

BACKGROUND OF THE INVENTION

Asymmetric digital subscriber line (ADSL) modems transmit high rate digital data over existing twisted pair telephone lines to connect residential customers to digital networks. Discrete multi-tone (DMT) is a multicarrier modulation technique used in xDSL systems for transmitting high speed data in the presence of significant inter-symbol interference. ADSL and DMT concepts are described in U.S. Pat. Nos. 5,408,260 and 5,533,008, and therein cited references, all of which are incorporated by reference herein. ADSL is well-suited for applications in which the data rate needed in both directions is not the same. Such an application is Internet access.

The Internet is gaining wide-spread use for both homes and offices. Most Internet applications use high speed transfer rates in the downstream direction from the central office (CO) to the remote unit (RU), and lower bit rates in the upstream direction from RU to CO. The transmission is full duplex; the transmit and receive happen simultaneously. Once the connection is established, it is desirable to maintain the connection even during idle periods.

For Internet applications, downstream data transmission rates at any given time depend upon current customer data download requests. This usually does not happen continuously (non-interrupt) during the connection. FIG. 1 shows the transmit portion of one ADSL modem connected through a channel to the receive portion of another modem. In this system both valid and idle data are treated the same—both forms of data pass through the entire encoding and decoding operations: crc, mux, synch, etc. Because idle data transmission conveys no information, many of the encoding and decoding operations could be eliminated with no decrease in data throughput. However, some form of filler data that does not require modulation/demodulation must be put in its place and a method of controlling system state transitions must be implemented.

SUMMARY OF THE INVENTION

Two methods for reducing computational requirements during idle transmission in digital subscriber line (DSL) modems are presented. Both methods reduce processing power during idle transmission Modulation computations in the transmitter are replaced with low-complexity pseudo-noise (PN) generation techniques that produce an idle signal that is spectrally compatible with xDSL systems. The PN signal is modified to convey the pilot tone information. The phase of the pilot tone is modulated (rotated by 180 degrees) in the transmitter to indicate idle/valid status of the current/next frame to the remote receiver. After detection of idle status at the receiver, most of the demodulation computations are avoided.

These methods are important because during idle times in an xDSL communication link they alleviate the heavy computational burden associated with transmission of valid data. The greater percentage of time that an xDSL connection is in the idle state, the greater the computational savings. In xDSL systems, many modems are co-located in the telephone company central office where the Internet service provider establishes a connection between the modems to the backbone data network, thus connecting the residential customers to the network. Although many modems may be connected at once, not all are transmitting valid data. Therefore, the method presented provides a mechanism for reducing the required computations, allowing computing resources to be shared among connections using statistical multiplexing.

DETAILED DESCRIPTION

Two methods are proposed for managing an established ADSL connection that enable complexity reduction through the use of special idle data sequences and idle status signaling. The invention re-routes the idle data frame through a new path that avoids full use of the modem's processor because full coding, modulation, demodulation, and decoding are not applied to the idle data sequences. During idle periods, an idle signal is generated that has the same spectral characteristics as a signal conveying valid data—thus spectral compatibility with ADSL is maintained. This is similar to the current ADSL standard where an idle signal is generated, scrambled, and modulated so that it appears to the rest of the system as valid data. However, the invention maintains spectral compatibility without using many of the computations required to send true ADSL idle data.

Both proposed methods use a pseudo-noise (PN) signal that is generated and processed one frame ahead of time. This is possible because the PN sequence is data independent. The PN signal will be transmitted in the place of a DMT frame of data, and hence must be conditioned to convey the required synchronization information. Specifically, it must carry synchronization on the pilot tone (tone number 64 of the downstream DMT multiplex and tone number 16 of the upstream) as per the T1E1.413 standard, "Network and Customer Installation Interfaces-Asymmetric Digital Subscriber Line (ADSL) Metallic Interface," American National Standards Institute (ANSI) T1.413, 1995, incorporated herein by reference. This can be achieved by first estimating the component of the PN signal that would be decoded at tone number 64/16 of a DMT receiver. This component is then removed and a new component is added that contains both the synchronization data and signaling information used to indicate the idle/valid status of current or future frames of data.

Figure 1:
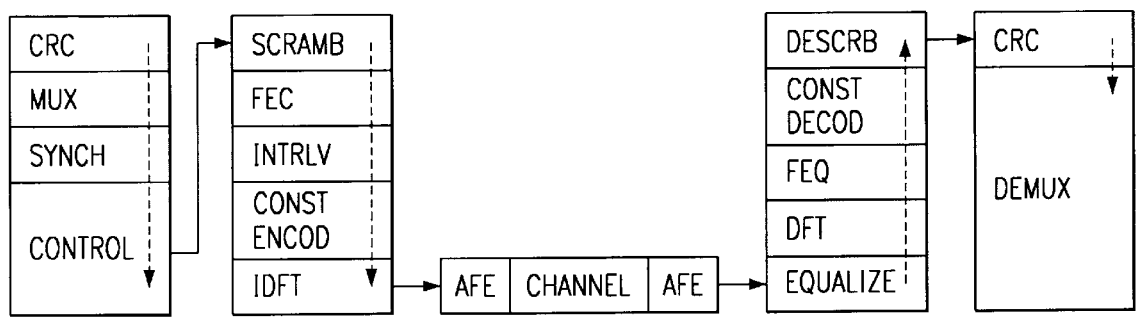
FIG. 1 shows a pair of XDSL modems communicating over a given channel; the data path through the transmitter and receiver illustrates the computations required for standard xDSL transmission.
Figure 2:
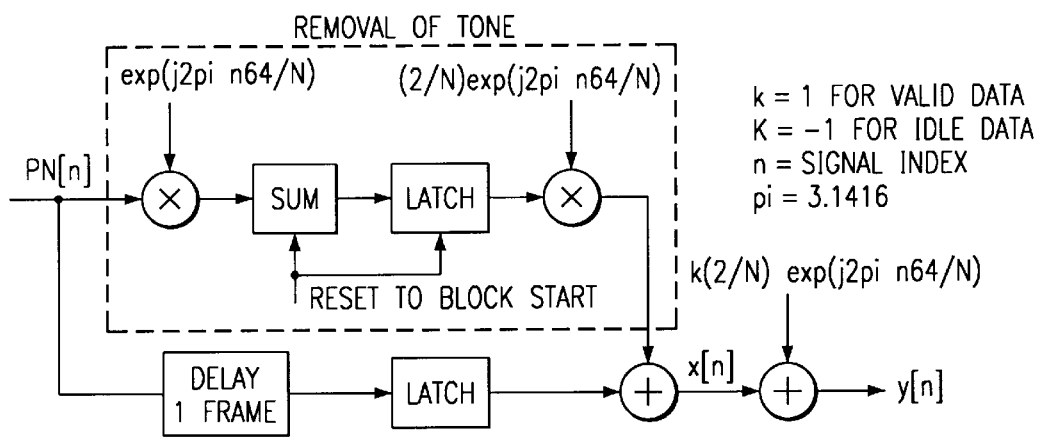
FIG. 2 shows a preferred method for modifying a PN signal to estimate and remove the frequency component at the pilot frequency. The desired pilot tone is then added into the signal, replacing the original random component.

A preferred embodiment that produces the PN sequence with the proper synchronization information is shown in FIG. 2. As an example of the downstream channel, the complex value in DMT subchannel 64 of the PN signal is estimated by multiplying the PN signal by a sine and cosine at frequency 2*pi*n*64/512 (where n is an index into the data frame) and integrating the result over one frame. Next, the appropriate pilot tone is added according to the signaling desired (as discussed in the following). The power level of the pilot tone is adjusted so that the spectral mask dictated by the ADSL standard is not violated.

The following two methods are proposed for a transmitter to indicate to the remote receiver that the current/next frame will not contain valid data, and hence the receiver can apply low-complexity techniques for decoding. Both methods are preferred embodiments for different applications.

Method 1
Self-contained Valid/Idle Frame Status

During transmission of valid data, both the data and the pilot tone are unaffected—this is standard ADSL transmission. When the entire frame contains idle data, the transmitter avoids modulation computations by using the data output from the special PN generator instead. The phase of the pilot in the PN signal is rotated by 180 degrees to indicate to the receiver that the current frame contains the special PN idle data and need not be demodulated. Because the phase of the pilot tone in a given frame indicates the valid/idle status data of that frame, the signaling information is self-contained in the frame. The data transmitted in a frame is unaffected by the data in past or future frames. Basically, the phase of the pilot tone in the current frame only relays information about the current frame and nothing about the next frame.

Two situations can occur;
1 If valid data in the current frame, then transmit valid data with the regular pilot tone.
2 If in the current frame, then transmit a PN sequence with a pilot tone added that has the phase rotated by 180 degrees.

Figure 3:
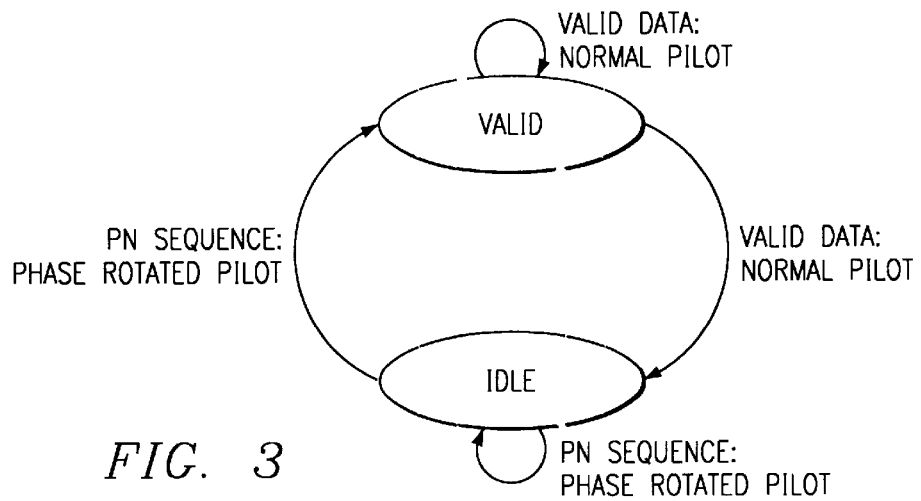
FIG. 3 shows the state diagram for Method 1. The transitions between the states are shown, and the branches are labeled with the current transmitter output, both data and pilot tone.

For completeness and comparison to Method 2, FIG. 3 shows a state diagram that further explains the state transitions and the pilot phase transmitted by a system implementing Method 1. The system is in the "valid" state while valid data is being transmitted and in the "idle" state while idle data is being transmitted. While in the valid state, the next state can be either valid or change to idle. If the next state is valid, then we send the valid data in the current frame with the regular ADSL pilot tone. If the next state is idle, then we also send the valid data in the current frame with the regular ADSL pilot tone. While in the idle state, the next state can be either idle or change to valid. If the next state is idle, then we send the idle data in the current frame with the phase of the pilot tone reversed. If the next state is valid, then we also send the idle data in the current frame with the phase of the pilot tone reversed. Basically, the phase of the pilot tone in the current frame only relays information about the current frame and nothing about the next frame. The two states, valid and idle, represent the system state as well as the data type being transmitted in the current frame. The transitions between states are labeled with the type of data and the phase of the pilot tone being transmitted in the current frame. Starting from the valid state, the system can either remain in the valid state or change to the idle state. If the next state is valid or idle, then valid data with the normal pilot tone is transmitted. Once in the idle state, the system can either remain in the idle state or change to the valid state. If the next state is idle or valid, then the PN sequence with the phase rotated pilot is transmitted. Because the required phase of the pilot tone in the PN sequence transmitted in the current frame is known a priori, the PN sequence is generated ahead of time with the PN frequency component at tone 64 removed and a phase reversed pilot tone put in its place.

Figure 4:
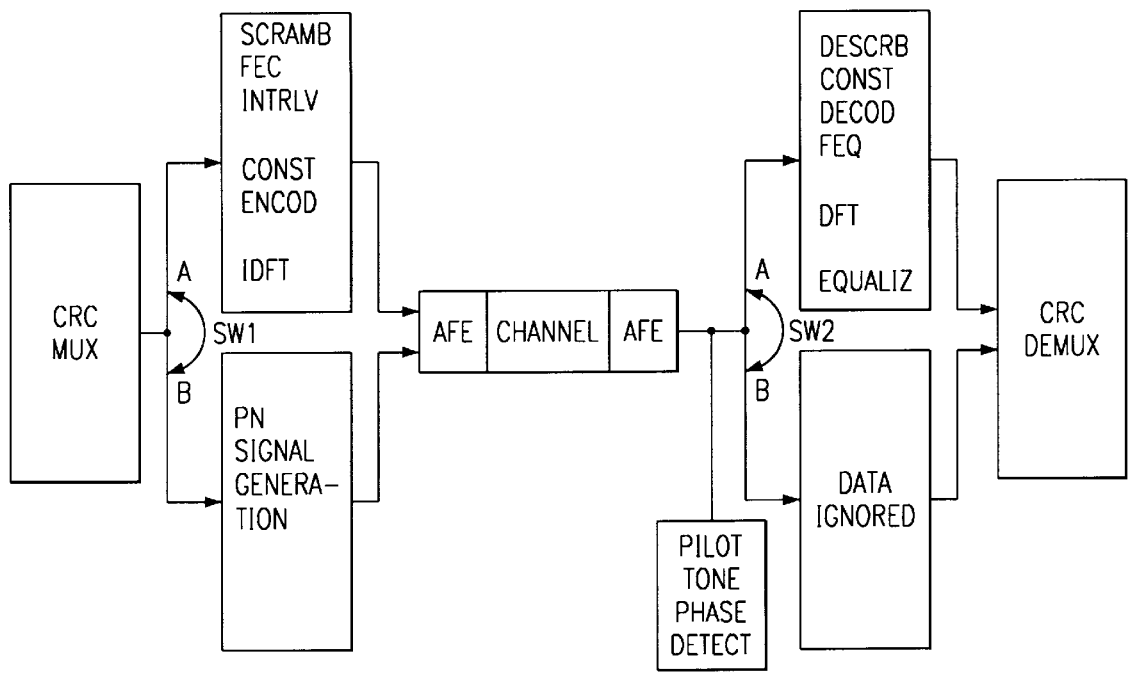
FIG. 4 shows the block diagram of a system that implements Method 1.

FIG. 4 shows a block diagram of the proposed Method 1 in which the idle signal takes a different path than a regular ADSL signal. To describe this method, we consider the transition from normal transmission to idle transmission and back to normal transmission.

Normal transmission:

During transmission of valid data, the switch SW1 in the transmitter side is in position A. The signal follows the normal transmit path through the scrambler, the forward error-correction coding (FEC), the interleaver, the constellation encoder and the inverse discrete Fourier transform (IDFT). At the receive side, switch SW2 is in position A, the signal passes through the normal receive path; the equalizer, the discrete Fourier transform (DFT) operation, frequency-domain equalizer (FEQ), constellation decoder, de-interleaver, descrambler, error-correction decoder.

Transmission of idle data:

The transmitter first determines the presence of idle data to be transmitted and initializes the transition to the low-complexity mode, selecting the second path by setting switch SW1 in position B. The transmitter must indicate this transition to the receiver using the pilot tone so that full-complexity decoding is not applied. The receiver must recognize from the pilot tone that idle data is being transmitted and set switch SW2 in position B. In the transmitter, the scrambler, FEC, interleaver, constellation encoding and IDFT operations are eliminated. In the receiver, the descrambler, FEC, de-interleaver, constellation decoding and DFT are eliminated. The eliminated transmit and receive operations result in considerable savings in power consumption and computational complexity for the modem.

The following steps embody a preferred method for implementing the technique:
i) Generate random data using the PN signal generation.
ii) Remove the component in tone 64 from the PN signal.
iii) Add the pilot data to tone 64 of the PN signal.
iv) Flip the phase of the pilot tone (rotate phase by 180 degrees).

The receiver will detect the phase inversion of the pilot, thus recognizing that the received data is idle data and full decoding need not be applied. Hence, the receiver will set switch SW2 to position B so that the received data propagates through the path with lowest complexity.

Next transmission of valid data:

When the transition from idle to valid data occurs, the transmitter moves switch SWI to position A and the pilot phase is reversed once again (thus going back to the original phase). The receiver detects this transition and moves switch SW2 to position A as well.

The state of the scrambler should be set to the value entered just prior to entering the idle transmission state. Other blocks can resume normal operations.

The receiving side (after detection of the second phase inversion) will continue descrambling, de-interleaving and decoding from the states associated with the last valid transmission. Equalization should be run during every frame regardless of the idle/valid status.

Method 2
Pilot Tone in Current Frame Indicates Change in Status of Next Frame

The second method for reducing computations during idle periods of ADSL transmission uses PN sequences for spectral compatibility as in Method 1 as well as a signaling scheme to indicate idle/valid status to the receiver. However, in this method the transmitter determines the type of data in the next frame and sends this information to the remote receiver during the present frame. Therefore, a buffering at the transmitter is required to collect the future data and analyze it before the current frame is transmitted. The receiver knows a priori if the next frame is to be decoded or not and can act accordingly.

Figure 6:
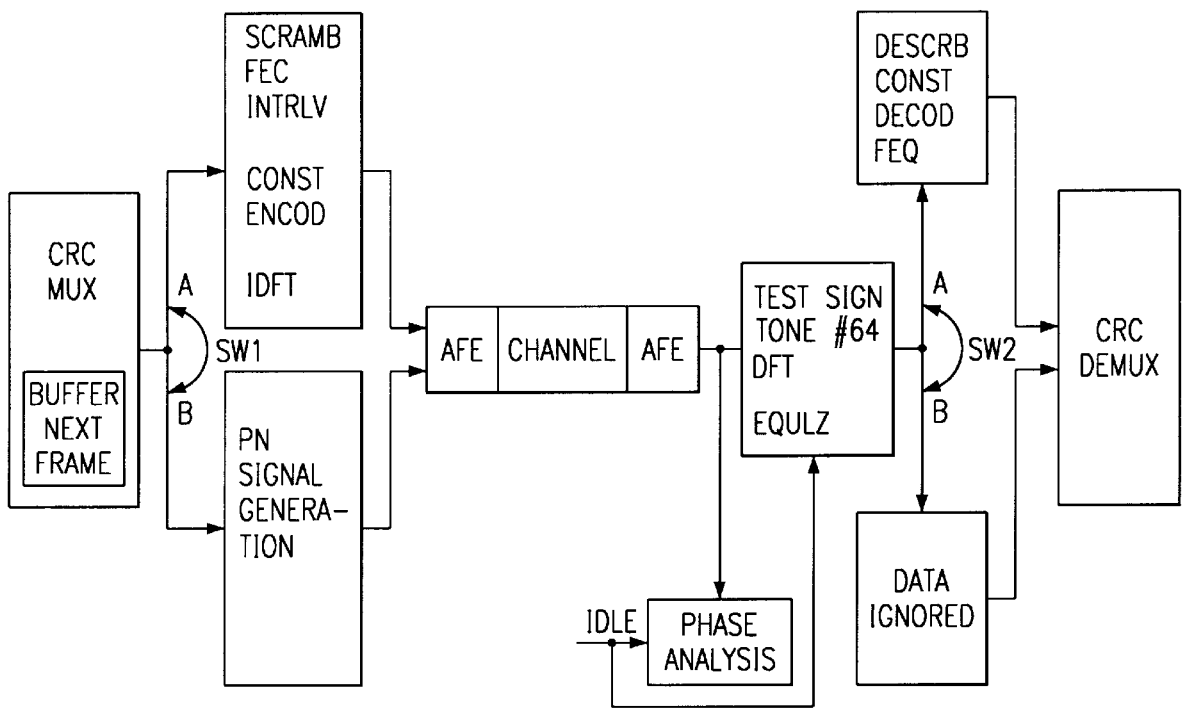
FIG. 6 shows the block diagram of a system that implements Method 2.

FIG. 6 shows a block diagram of a system that implements Method 2. At the transmit side, a buffer of one future frame is saved and analyzed. If the current frame contains valid data then switch SW1 is placed in position A, resulting in standard ADSL transmission. However, if the current frame contains idle data, then switch SW1 is placed in position B so that the PN sequence generated using low-complexity techniques is transmitted instead. At the receiver, switched SW2 is placed in position A to decode valid data or in position B to avoid full-complexity decoding.

The transmitter indicates the valid/idle status of the next frame to the remote receiver by modulating the phase of the pilot tone in the current frame. If the next frame contains valid data, the pilot phase will not be altered. However, if the next frame contains idle data, then the pilot phase will be rotated by 180 degrees.

During decoding of valid data, the phase of the pilot tone is easily determined by analyzing tone number 64 after decoding. If the normal phase is observed, then switch SW2 is left in position A since the next frame contains valid data that requires full decoding. However, if the receiver detects phase rotation of the pilot, then switch SW2 is set to position B for the following frame of idle data.

During reception of idle data, the receiver must compute the phase of the pilot tone to determine the status of the next frame. This can be accomplished using low-complexity techniques. A preferred method uses correlation of the received data sequence with the pilot tone. If the normal pilot tone is detected, then switch SW2 is moved to position A for the next frame to decode valid data. If a phase-rotated pilot tone is detected, then switch SW2 is left in position B to avoid full decoding of the next frame.

Thus, four situations can occur:
1. If valid data in the current frame, valid data in the next frame, then transmit valid data with the regular pilot tone.
2. If valid data in the current frame, and idle data in the next frame, then transmit valid data with a phase rotated pilot tone.
3. idle data in the current frame, and idle data in the next frame, then transmit a PN sequence with a pilot tone added that has the phase rotated by 180 degrees.
4. If idle data in the current frame, valid data in the next frame—transmit a PN sequence with a regular ADSL pilot tone added.

Figure 5:
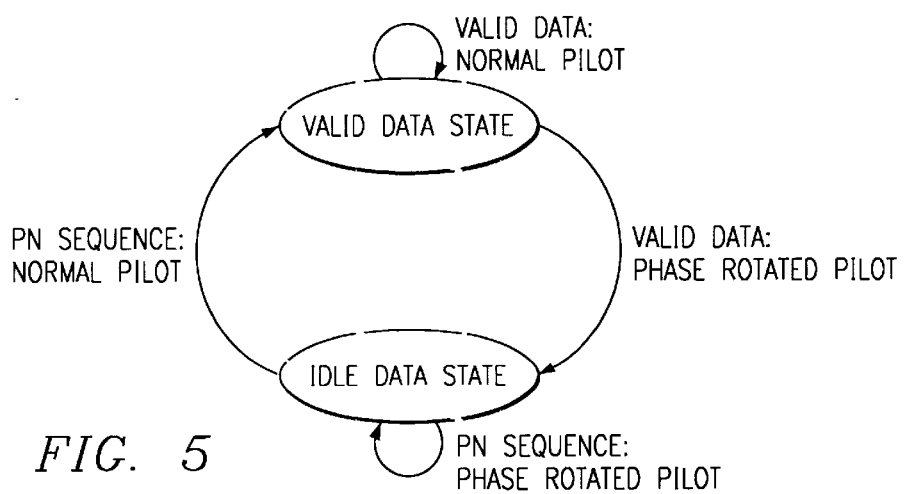
FIG. 5 shows the state diagram for Method 2. The transitions between the states are shown, and the branches are labeled with the current transmitter output, both data and pilot tone.

FIG. 5 shows a state diagram that further explains the transitions of the system and the pilot phase transmitted during state transitions. The two states, valid and idle, represent the system state as well as the data type being transmitted in the current frame. The transitions between states are labeled with the type of data and the phase of the pilot tone being transmitted in the current frame. Starting from the valid state, the system can either remain in the valid state or change to the idle state. If the next state is valid, then valid data with the normal pilot tone is transmitted. If the next state is idle, then valid data with a phase-rotated pilot tone is transmitted to indicate to the remote receiver that the next frame will contain idle data. Once in the idle state, the system can either remain in the idle state or change to the valid state. If the next state is idle, then the PN sequence with the phase rotated pilot is transmitted. If the next state is valid, then the PN sequence with the normal pilot phase is transmitted to indicate to the remote receiver that the next frame will contain valid data.

Regardless of the data carried in the current frame, the phase of the pilot tone always relays information about the next frame, i.e. the phase is independent of the data in the current frame. Because the required phase of the pilot tone in the PN sequence transmitted in the current frame is unknown a priori, the PN sequence is generated ahead of time with the frequency component at tone 64 removed. After analysis of the next frame to determine the pilot phase required, the pilot tone with the appropriate phase is added to the PN sequence on-the-fly. The preferred embodiment for generating the special PN sequence with the correct pilot tone information is identical to that discussed previously for Method 1, but the timing of the operations is adjusted to produce the PN sequence just before transmission.

Comparison of Methods 1 and 2

Figure 7A:
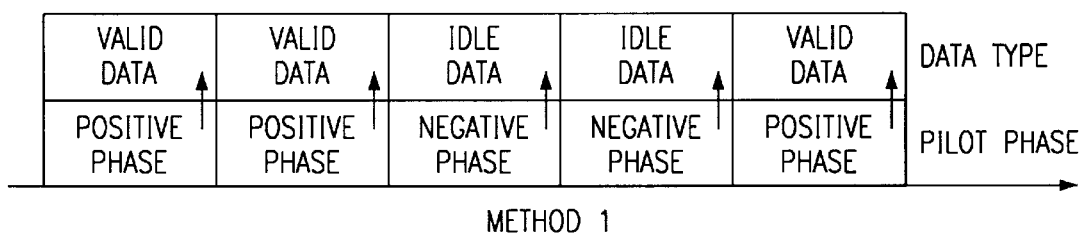
FIGS. 7A–7B show an example of the pilot tone phase associated with varying types of data in an xDSL transmission for both Methods 1 and 2.
Figure 7B:
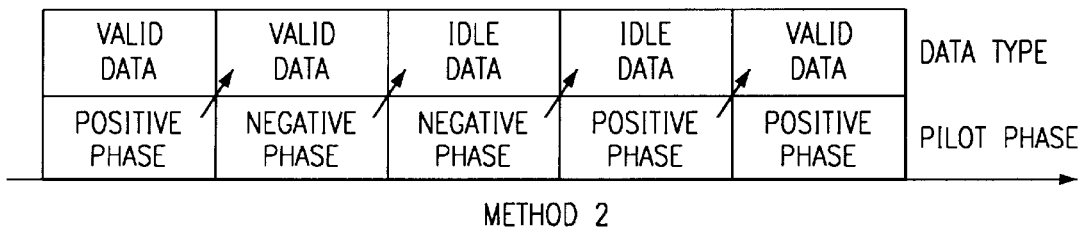

Both Methods 1 and 2 rely on the transmission of PN signals that are produced using low-complexity techniques to provide spectral compatibility with the ADSL standard. Both methods reduce the number of computations during idle times in both the transmitter and receiver by avoiding full modulation and demodulation. Both methods use modulation of the pilot tone for the transmitter to indicate to the receiver the status of current/next frames of data. However, the meaning of the pilot modulation varies for the two methods. Method 1 modulates the phase of the pilot tone to indicate to the remote receiver the status of the data in the current frame, while Method 2 modulates the phase of the pilot tone to indicate the status of the data in the next frame. This is shown explicitly in FIGS. 7A. and 7B.

The convenience of Method 1 is that no buffering at the transmit side is required. However, a pilot phase detection is required at the receiver for every frame. The phase detection in Method 2 is avoided during decoding of valid data (simply check the sign of tone 64) and does not add any computational burden. However, Method 2 requires the extra buffering of the next frame. The use of one method versus the other is application dependent.

What is claimed is:
1. A method for reducing computational requirements in digital data communications between digital subscriber line (DSL) transmitter and receiver modems, comprising:
during transmitter modem active periods, generating data frames with valid status through multi-tone modulation of a bit stream containing information to be transmitted to the receiver modem;
during transmitter modem idle periods, generating data frames with idle status through generation of pseudo-noise (PN);
modulating a pilot tone to indicate difference in status between the valid or idle status of the data frames;
transmitting valid or idle status data frames together with the modulated pilot tone from the transmitter modem to the receiver modem;

detecting the valid or idle status of data frames from the received pilot tone;

if the detected data frame status is valid, recovering the information through computational steps for demodulation of data frames; and if the detected data frame status is idle, skipping at least some of the computational steps.

2. The method of claim 1, wherein the pilot tone is modulated by rotating its phase 180 degrees to indicate difference in status between valid and idle status.

3. The method of claim 1, wherein the data frames generated during idle periods have the same spectral characteristics as data frames generated during active periods.

4. A method for reducing computational requirements in digital data communications between digital subscriber line (DSL) transmitter and receiver modems, comprising:

during transmitter modem active periods, generating data frames with valid status using discrete multitone (DMT) modulation of a bit stream containing information to be transmitted to the receiver modem;

during transmitter modem idle periods, generating data frames with idle status using a data independent pseudo-noise (PN) sequence, conditioned to convey synchronization information:

modulating a pilot tone to indicate valid or idle status of the data frames;

transmitting valid or idle status data frames together with the modulated pilot tone from the transmitter modem to the receiver modem;

detecting the valid or idle status of data frames from the received pilot tone;

if the detected data frame status is valid, recovering the information through computational steps for demodulation of data frames; and if the detected data frame status is idle, skipping at least some of the computational steps.

5. The method of claim 4, wherein during transmitter modem active periods, data frames with valid status are generated using discrete multitone (DMT) modulation for ADSL transmissions, and wherein the PN sequence is conditioned by first estimating the component of the PN signal that would be decoded at tone number 64/16 of an ADSL DMT receiver; then removing that component and replacing it with a new component that contains the synchronization information.

6. The method of claim 5, wherein the new component also contains signaling information to indicate the valid or idle status.

7. The method of claim 6, wherein the complex value of the PN signal component in DMT tone number 64/16 is estimated by multiplying the PN signal by a sine and cosine at frequency $2*pi*n*64/512$ and integrating the result over one frame.

8. The method of claim 4, wherein, if detected data frame status is idle, the receiver does not demodulate the associated idle status data frame.

9. The method of claim 4, wherein, during transmitter active periods, data frames are generated through constellation encoder and inverse discrete Fourier transform operations; and during transmitter idle periods, data frames are generated without constellation encoder and inverse discrete Fourier transform operations.

10. The method of claim 4, wherein, if detected data frame status is valid, information is recovered through discrete Fourier transform and constellation decoder operations; and, if detected data frame status is idle, discrete Fourier transform and constellation decoder operations are avoided.

11. The method of claim 4, wherein, if detected data frame status is valid, information is recovered through at least one of equalizer, discrete Fourier transform, frequency-domain equalizer, constellation decoder, de-interleaver, descrambler and error-correction decoder operations; and, if detected data frame status is idle, at least said one operation is avoided.

12. The method of claim 1, wherein, if detected data frame status is idle, the receiver does not demodulate the associated idle status data frame.

13. The method of claim 1, wherein, during transmitter active periods, data frames are generated through constellation encoder and inverse discrete Fourier transform operations; and during transmitter idle periods, data frames are generated without constellation encoder and inverse discrete Fourier transform operations.

14. The method of claim 1, wherein, if detected data frame status is valid, information is recovered through discrete Fourier transform and constellation decoder operations; and, if detected data frame status is idle, discrete Fourier transform and constellation decoder operations are avoided.

15. The method of claim 1, wherein, during transmitter active periods, data frames are generated through scrambler, forward error-correction, interleaver, constellation encoder and inverse discrete Fourier transform operations; and during transmitter idle periods, data frames are generated without going through scrambler, forward error-correction, interleaver, constellation encoder and inverse discrete Fourier transform operations.

16. The method of claim 15, wherein, if detected data frame status is valid, information is recovered through equalizer, discrete Fourier transform, frequency-domain equalizer, constellation decoder, de-interleaver, descrambler and error-correction decoder operations; and, if detected data frame status is idle, discrete Fourier transform, constellation decoder, de-interleaver, descrambler and error-correction decoder operations are avoided.

17. The method of claim 1, wherein, if detected data frame status is valid, information is recovered through at least one of equalizer, discrete Fourier transform, frequency-domain equalizer, constellation decoder, de-interleaver, descrambler and error-correction decoder operations; and, if detected data frame status is idle, at least said one operation is avoided.

18. The method of claim 1, wherein, during transmitter active periods, data frames are generated through scrambler, forward error-correction, interleaver, constellation encoder and inverse discrete Fourier transform operations; and during transmitter idle periods, data frames are generated without going through scrambler, forward error-correction, interleaver, constellation encoder and inverse discrete Fourier transform operations.

19. The method of claim 18, wherein, if detected data frame status is valid, information is recovered through equalizer, discrete Fourier transform, frequency-domain equalizer, constellation decoder, de-interleaver, descrambler and error-correction decoder operations; and, if detected data frame status is idle, discrete Fourier transform, constellation decoder, de-interleaver, descrambler and error-correction decoder operations are avoided.

20. A method for reducing computational requirements in multitone modulation data communications between transmitter and receiver modems, comprising:

during transmitter active periods, generate data frames with valid status from source information using data encoding and inverse data transformation operations;

during transmitter idle periods, generate data frames with idle status using random data generator operations;

add valid or idle status indicator information in at least one tone of valid or idle transmitted data frames;

transmit data frames with status indicator information from transmitter to receiver;

detect valid or idle status indication from received at least one tone;

for data frames with valid status, apply data transformation and data decoding operations to recover source information; and for data frames with idle status, skip at least some of the computations needed for the transformation and the decoding operations.

* * * * *